United States Patent [19]

Kluczynski et al.

[11] 4,148,449
[45] Apr. 10, 1979

[54] PHOTOGRAPHIC FILM CASSETTE INCORPORATING A FILM LOCK

[75] Inventors: Achim Kluczynski, Immekeppel; Erik Altmann, Muehlheim, both of Fed. Rep. of Germany

[73] Assignee: AGFA-Gevaert AG, Leverkusen, Fed. Rep. of Germany

[21] Appl. No.: 893,087

[22] Filed: Apr. 3, 1978

[30] Foreign Application Priority Data

Apr. 7, 1977 [DE] Fed. Rep. of Germany ....... 2715554

[51] Int. Cl.² .............................................. G03B 1/04
[52] U.S. Cl. .................................................. 242/71.2
[58] Field of Search ....................... 242/71, 71.1, 71.2, 242/195, 197

[56] References Cited

U.S. PATENT DOCUMENTS

| | | | |
|---|---|---|---|
| 3,705,696 | 12/1972 | Edwards | 242/71.2 |
| 3,944,154 | 3/1976 | Hahn | 242/71.2 |
| 3,955,771 | 5/1976 | Ishii | 242/71.2 |

Primary Examiner—Edward J. McCarthy
Attorney, Agent, or Firm—Connolly and Hutz

[57] ABSTRACT

The present invention relates to a photographic film cassette comprising a feed compartment and a take-up compartment, which communicate through a slot like film passageway with an exposure station inbetween. The film side wall of the film passageway to the take up compartment is provided with a depression which continuously tapers in its width and which runs out to the original surface in its depth.

A side wall of the depression is undercut to engage with a widening end of the film to prevent the film from being completely drawn into the take-up compartment. A projection is provided on the paper chafing patch side wall of the exit of the film passageway to the take-up compartment to help putting the film in the depression.

7 Claims, 3 Drawing Figures

PHOTOGRAPHIC FILM CASSETTE INCORPORATING A FILM LOCK

This invention relates to a photographic film cassete comprising a feed compartment and a take-up compartment which communicate through slot-like film passageways with an exposure station in between, and a film lock for preventing the end of the film from being completely taken into the take-up compartment.

When the last frame has been exposed, the film is wound into the take-up compartment except for its end in order to avoid harmful exposures before removal of the cassette. This end of the film is then used for withdrawing the film for the purposes of development. Unless this end of the film is present, the welded cassettes have to be broken open which involves additional labour costs and the risk of damage to the film. In addition, the working sequence is interrupted which results in a reduction in output, particularly in the case of automatic developing machines. Accordingly, it is important safely to prevent the end of the film from being wound into the take-up compartment.

It is known from U.S. Pat. No. 3,705,696 that a photographic film strip can be provided at its non-perforated end with an elongated hole arranged obliquely of the film path. A tooth projecting from the extension-side wall of the take-up chamber engages in this hole for locking the end of the film.

The obvious disadvantage of this film strip is that the paper chafing patch and the film have to be specially stamped and then fitted together. Since this fitting together of the paper chafing patch and the film is governed solely by the degree of friction between them, the two strips can be longitudinally displaced relative to one another, in which case the opening in the end of the paper chafing patch no longer coincides with the perforation in the end of the film. The result of this is that the locking tooth is unable to engage in the perforation so that the film strip can be drawn into the take-up compartment. In addition, the locking tooth is unable to prevent the film from sliding over in the event of an excessive or sudden pulling force.

An object of the present invention is to find a cassette in which the end of the film is safely prevented from being drawn into the take-up compartment after exposure of the last frame and which is easier to handle during assembly.

In accordance with the invention there is provided a photographic film cassette, comprising a feed compartment and a take-up compartment, which communicate through a slot-like film passageway with an exposure station inbetween, the film-side wall of the film passageway to the take-up compartment being provided with a depression which continuously tapers in its width and which runs out to the original surface in its depth, and a side wall of the depression being undercut to engage with a widening end of the film to prevent the film from being completely drawn into the take-up compartment.

The advantages afforded by the invention lie particularly in the fact that a strip widening conically towards its end, which can be produced simply by stamping the film, is safely drawn into a depression provided on one or both sides with undercut side walls by virtue of the tendency towards curling which is inherent in the film. In addition, it is possible to allow contact to be taken up gradually during the locking operation by inclining the stamped film and the depression in the film-side wall of the passageway to different extents.

Accordingly, the end of the film is locked irrespective of the particular longitudinal position of the paper chafing patch relative to the film strip during take-up. In addition, there is no longer any need for the paper chafing patch to be formed with an opening, thereby saving the operation which this would involve.

In one particular embodiment, a projection is arranged on the extension-side wall at the exit of the film passageway to the take-up compartment.

The advantage of this projection is that it promotes the tendency of the film to curl on entering the depression and improves the inpermeability of the passageway to light.

One embodiment of the invention is described by way of example in the following with reference to the accompanying drawings, wherein.

Figure 1:
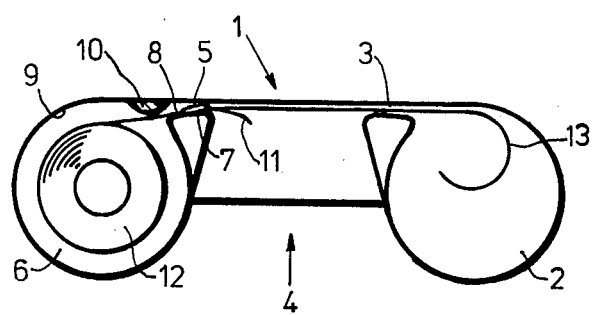
FIG. 1 is a section through the cassette.

FIG. 1 is a section through a cassette 1 which consists of a feed compartment 2 with a slot-like passageway 3 to the exposure station 4 which is adjoined by a slot-like passageway 5 with a take-up compartment 6 having a reel of film 12 therein. A depression 7 acting as a film lock is provided in the film-side wall 8 of the passageway 5 which is followed by a projection 10 extending over the entire width of the cassette on the extension-side wall 9. The cassette is loaded with a roll of film and, in the position illustrated, the film end 11 is shown in the locked position extending from the film feed passageway. The paper chafing patch or backing 13 for guiding the film extends into the feed compartment 2.

Figure 2:
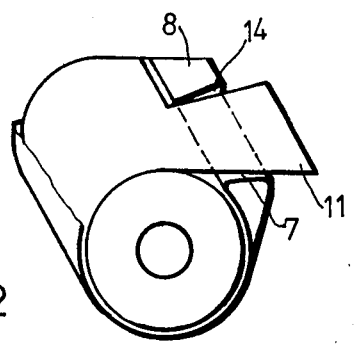
FIG. 2 is a perspective view of a locked extension film end.

FIG. 2 is a perspective view of part of the take-up compartment 6 with the released film end 11 in the locked position the wall 8 originally on the film side, the depression 7 and the undercut side wall 14.

Figure 3:
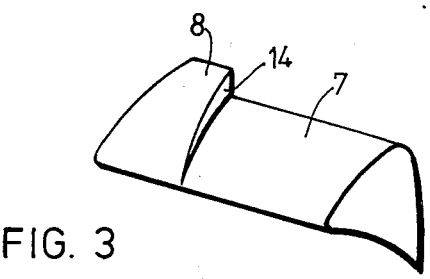
FIG. 3 shows a detail of the film-side wall of the passageway.

FIG. 3 shows an embodiment of the film-side wall 8 with the depression 7 terminating towards the take-up compartment 6 and the undercut side wall 14.

When the film is drawn into the take-up compartment 6, the film end 11 has a tendency to curl with the assistance of the collar or projection 10, after it has been released by the slot-like passageway 3 of the feed compartment 2, so that the stamped-out film end 11 jumps into the depression 7 in the film-side wall 8 of the passageway 5 where it is held firmly between the undercut side wall 14 and the outer wall of the cassette (not shown).

What we claim is:

1. A photographic film cassette comprising substantially cylindrical feed and take-up compartments connected to each other by a slot-like film passageway having two sides and an exposure station disposed between the compartments, one of its sides being substantially tangent to the compartments, the other side of the film passage having a depression which tapers inwardly and slopes upwardly in the direction of feed of the film whereby the depression can engage a similarly tapered tail on the film which is slightly smaller than the depression to prevent the film from being completely drawn into the take-up compartment.

2. A photographic film cassette as set forth in claim 1, wherein a projection is provided on the tangent wall within the film passageway in alignment with the path of movement of the tail whereby the tail is prevented from moving out of the depression.

3. A photographic film cassette as set forth in claim 1 in combination with a film having the tail and a natural tendancy to curl into engagement with the depression.

4. A photographic film cassette as set forth in claim 3, wherein the tail has a taper which is slightly shallower than that of the depression.

5. A photographic film cassette as set forth in claim 2 in combination with a film having the tail.

6. A photographic film cassette as set forth in claim 1, wherein the depression has at least one edge which is inclined to the direction of feed of the film.

7. A photographic film cassette as set forth in claim 3, wherein the tail also has one edge which is inclined relative to the direction of feed of the film.

* * * * *